(12) United States Patent
Kim et al.

(10) Patent No.: US 7,543,631 B2
(45) Date of Patent: Jun. 9, 2009

(54) EXHAUST GAS HEAT EXCHANGER FOR COGENERATION SYSTEM

(75) Inventors: Cheol Min Kim, Seoul (KR); Cheol Soo Ko, Kyungki-do (KR); Sim Bok Ha, Kyungki-do (KR); Baik Young Chung, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 345 days.

(21) Appl. No.: 11/250,541

(22) Filed: Oct. 17, 2005

(65) Prior Publication Data

US 2006/0124273 A1      Jun. 15, 2006

(30) Foreign Application Priority Data

Dec. 10, 2004   (KR) ............. 10-2004-0104371

(51) Int. Cl.
F28D 7/10      (2006.01)
F02M 31/08     (2006.01)
(52) U.S. Cl. ..................... 165/157; 165/52
(58) Field of Classification Search ........... 165/51, 165/52, 66, 141, 145, 153, 157, 159, 166, 165/167, 108
See application file for complete search history.

(56) References Cited

U.S. PATENT DOCUMENTS

| | | | | |
|---|---|---|---|---|
| 1,961,533 A * | 6/1934 | Stancliffe | ............... | 165/159 |
| 3,434,532 A * | 3/1969 | Henriksson | ............... | 165/75 |
| 3,732,921 A * | 5/1973 | Hilicki et al. | ............... | 165/154 |
| 3,866,674 A * | 2/1975 | Tramuta et al. | ............... | 165/166 |
| 4,440,217 A * | 4/1984 | Stieler | ............... | 165/155 |
| 4,621,677 A * | 11/1986 | Suzuki et al. | ............... | 165/135 |
| 4,966,231 A * | 10/1990 | Belcher et al. | ............... | 165/166 |
| 6,250,380 B1 * | 6/2001 | Strahle et al. | ............... | 165/167 |
| 2003/0116305 A1 * | 6/2003 | Beddome et al. | ............... | 165/81 |
| 2005/0039896 A1 * | 2/2005 | Laine et al. | ............... | 165/157 |

FOREIGN PATENT DOCUMENTS

| | | |
|---|---|---|
| CN | 2325747 Y | 6/1999 |
| CN | 1442663 A | 9/2007 |
| DE | 444 266 C | 5/1927 |
| EP | 0 659 475 A1 | 6/1995 |
| FR | 2 412 807 A | 7/1979 |
| GB | 265597 A | 9/1927 |
| JP | 08-049534 A | 2/1996 |

\* cited by examiner

*Primary Examiner*—Tho v Duong
(74) *Attorney, Agent, or Firm*—Birch, Stewart, Kolasch & Birch, LLP

(57) ABSTRACT

An exhaust gas heat exchanger for a cogeneration system is disclosed. In the exhaust gas heat exchanger, a heat exchanger cover is arranged around a heat exchanger body such that a primary heat medium passage, through which a heat medium passes, is defined between the heat exchanger cover and the heat exchanger body. In the heat exchanger body, a heat medium tube forming a secondary heat medium passage, through which the heat medium emerging from the primary heat medium passage passes, is arranged. Accordingly, the heat medium primarily absorbs heat from the exhaust gas while passing through the primary heat medium passage, and then secondarily absorbs heat from the exhaust gas while passing through the secondary heat medium passage. As a result, an enhancement in heat exchanging efficiency is achieved.

7 Claims, 3 Drawing Sheets

EXHAUST GAS HEAT EXCHANGER FOR COGENERATION SYSTEM

BACKGROUND OF THE INVENTION

1. Field of the Invention

The present invention relates to an exhaust gas heat exchanger for a cogeneration system, and, more particularly, to an exhaust gas heat exchanger for a cogeneration system which not only achieves an enhancement in the efficiency of heat exchanger between exhaust gas and a heat medium, but also has a compact structure.

2. Description of the Related Art

In general, cogeneration systems are adapted to generate both electricity and heat from a single energy source.

Such a cogeneration system can recover heat of exhaust gas or waste heat of cooling water generated from an engine or turbine during an electricity generation operation, so that the cogeneration system can achieve an increase in energy efficiency of 70 to 80% over other systems. By virtue of such an advantage, the cogeneration system has recently been highlighted as an electricity and heat supply source for buildings. In particular, the cogeneration system exhibits highly-efficient energy utilization in that the recovered waste heat is mainly used to heat/cool a confined space and to heat water.

FIG. 1 is a schematic view illustrating a configuration of a conventional cogeneration system which is used for a cooling and heating apparatus.

As shown in FIG. 1, the conventional cogeneration system include an engine 1 to which fuel is supplied, a generator 3 which is driven to generate electricity, a cooling water heat exchanger 5 which recovers heat from cooling water used to cool the engine 1, and an exhaust gas heat exchanger 9 which is arranged at an exhaust gas discharge conduit 7 extending from the engine 1 to recover heat from exhaust gas discharged from the engine 1. The cogeneration system also includes a heat transfer line which transfers the recovered cooling water heat and exhaust gas heat to a cooling and heating apparatus 20.

The electricity generated from the generator 3 is used to operate various electronic appliances including the cooling and heating apparatus 20 and illumination devices.

The waste heat generated from the engine 1, that is, the heat generated from the cooling water used to cool the engine 1 and the heat generated from the exhaust gas discharged from the engine 1, is used in the cooling and heating apparatus 20 during a heating operation of the cooling and heating apparatus 20, and is outwardly discharged during a cooling operation of the cooling and heating apparatus 20. In order to outwardly discharge the waste heat generated from the engine 1 during the cooling operation of the cooling and heating apparatus 20, the cogeneration system also includes a radiator 17 which includes a heat exchanger 15 and a radiating fan 16.

The cooling and heating apparatus 20 is of a heat pump type so that it is used not only as a cooling apparatus, but also as a heating apparatus, in accordance with reversal of a refrigerant flow in a refrigerant cycle in the cooling and heating apparatus 20. As in a typical heat pump type cooling and heating apparatus, the cooling and heating apparatus 20 includes a compressor 21, a 4-way valve 23, an outdoor heat exchanger 25, an outdoor fan 26, an expansion device 27, and an indoor heat exchanger 29.

An air pre-heating heat exchanger 30 is arranged near the outdoor heat exchanger 25 in order to pre-heat air supplied toward the outdoor heat exchanger 25, using the waste heat of the engine 1.

The air pre-heating heat exchanger 30 is connected to the cooling water heat exchanger 5 and exhaust gas heat exchanger 9 via the heat transfer line 11.

Meanwhile, the exhaust gas heat exchanger 9 includes a shell 31 arranged in the exhaust gas discharge conduit 7 such that exhaust gas introduced into the exhaust gas discharge conduit 7 passes through the shell 31, and a heat medium tube 32 arranged in the shell 31. A heat medium is circulated through the heat medium tube 32.

Hereinafter, operation of the conventional cogeneration system having the above-mentioned configuration will be described.

First, exhaust gas discharged from the engine 1 during the heating operation of the cooling and heating apparatus 20 is introduced into the shell 31 of the exhaust gas heat exchanger 9, and passes through the shell 31.

The exhaust gas transfers heat to the heat medium flowing through the heat medium tube 32 while passing through the shell 31. The heat medium flows to the air pre-heating heat exchanger 30 after absorbing the heat of the exhaust gas, and pre-heats outdoor air in the air-preheating heat exchanger 30.

The pre-heated air is supplied to the outdoor heat exchanger 25, and heat-exchanges with the outdoor heat exchanger 25. Since the pre-heated air is supplied to the outdoor heat exchanger 25, it is possible to prevent a degradation in the heating capacity of the heat pump, which may be caused by a low outdoor air temperature.

Meanwhile, it is unnecessary to supply the recovered waste heat to the cooling and heating apparatus 20 during the cooling operation of the cooling and heating apparatus 20. In this case, accordingly, the flow path of the heat medium is changed to be connected to a radiating line 13, which is connected to the heat transfer line 11, in order to outwardly discharge the recovered waste heat through the radiator 17, or to supply the recovered waste heat to another system such as a hot water supplying apparatus.

In FIG. 1, reference character "P" designates pumps respectively adapted to pump the heat medium such that the heat medium is circulated through desired lines, and reference character "V" designates a valve adapted to change the flow path of the heat medium between the heat transfer line 11 and the radiating line 13.

In the above-mentioned conventional cogeneration system, however, there is a problem in that it is necessary to increase the size of the exhaust gas heat exchanger for an enhancement in efficiency because the exhaust gas heat exchanger includes the shell, through which exhaust gas passes, and the heat medium tube, through which the heat medium passes.

SUMMARY OF THE INVENTION

The present invention has been made in view of the above-mentioned problems, and it is an object of the invention to provide an exhaust gas heat exchanger for a cogeneration system which achieves an enhancement in the efficiency of heat exchange with exhaust gas, and has a compact structure, thereby being capable of achieving an enhancement in system efficiency.

In accordance with the present invention, this object is accomplished by providing an exhaust gas heat exchanger for a cogeneration system comprising: a heat exchanger body provided with an exhaust gas inlet, through which exhaust gas discharged from an engine is introduced into the heat exchanger body, and an exhaust gas outlet, through which the exhaust gas is discharged from the heat exchanger body; a heat exchanger cover arranged to enclose the heat exchanger body such that a primary heat medium passage, through which a heat medium passes, is defined between an outer wall surface of the heat exchanger body and an inner wall surface of the heat exchanger cover; and a heat medium tube arranged to extend through the heat exchanger body, and adapted to form a secondary heat medium passage, through which the heat medium emerging from the primary heat medium passage passes.

The heat exchanger body may have a box-shaped structure having plate-shaped walls.

The exhaust gas heat exchanger may further comprise a mesh member arranged between an inner wall surface of the heat exchanger body and the heat medium tube.

The heat medium tube may comprise a heat medium inlet tube extending through the heat exchanger body, a heat medium outlet tube extending through the heat exchanger body at a position different from a position of the heat medium inlet tube, and a plurality of connecting tubes each arranged in the heat exchanger body, and connected with the heat medium inlet tube and the heat medium outlet tube.

Each connecting tube may have a hollow structure having plate-shaped walls.

The exhaust gas heat exchanger may further comprise a flow guide arranged in the primary heat medium passage to vary a flow path defined by the primary heat medium passage.

The flow guide may comprise a plurality of guide protrusions protruded from at least one of the inner wall surface of the heat exchanger cover and the outer wall surface of the heat exchanger body.

In accordance with another aspect, the present invention provides an exhaust gas heat exchanger for a cogeneration system comprising: a heat exchanger body provided with an exhaust gas inlet, through which exhaust gas discharged from an engine is introduced into the heat exchanger body, and an exhaust gas outlet, through which the exhaust gas is discharged from the heat exchanger body; a heat exchanger cover arranged to enclose the heat exchanger body such that a primary heat medium passage, through which a heat medium passes, is defined between an outer wall surface of the heat exchanger body and an inner wall surface of the heat exchanger cover; a heat medium tube arranged to extend through the heat exchanger body, and adapted to form a secondary heat medium passage, through which the heat medium emerging from the primary heat medium passage passes; and a flow guide arranged in the primary heat medium passage to vary a flow path defined by the primary heat medium passage.

The flow guide may comprise a plurality of guide protrusions protruded from at least one of the inner wall surface of the heat exchanger cover and the outer wall surface of the heat exchanger body.

The heat exchanger body may have a box-shaped structure having plate-shaped walls.

Since the heat exchanger cover is arranged around the heat exchanger body such that the primary heat medium passage, through which the heat medium passes, is defined between the heat exchanger cover and the heat exchanger body, and the heat medium tube forming the secondary heat medium passage, through which the heat medium emerging from the primary heat medium passage passes, is arranged in the heat exchanger body, the heat medium primarily absorbs heat from the exhaust gas while passing through the primary heat medium passage, and then secondarily absorbs heat from the exhaust gas while passing through the secondary heat medium passage. As a result, an enhancement in heat exchanging efficiency is achieved.

Since the heat exchanger cover arranged around the heat exchanger body functions to insulate the heat of the exhaust gas introduced into the heat exchanger body, it is possible to minimize loss of heat.

Also, the shield member is separably mounted to the heat exchanger body. Accordingly, there is an advantage in that it is possible to easily remove soot attached to the inner wall surface of the heat exchanger body when the exhaust gas passes through the heat exchanger body.

Since the heat exchanger body has a box-shaped structure having plate-shaped walls, and each connecting tube has a hollow structure having plate-shaped walls, they have large heat transfer areas, respectively, so that an enhancement in heat exchanging efficiency is achieved. The space occupied by the heat exchanger body and connecting tubes is reduced, so that the utility of space can be improved. It is also possible to realize a compact structure of the exhaust gas heat exchanger.

In addition, since the flow guide is arranged in the primary heat medium passage, it is possible to enhance the heat exchanging efficiency of the heat medium passing through the primary heat medium passage.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Figure 1:
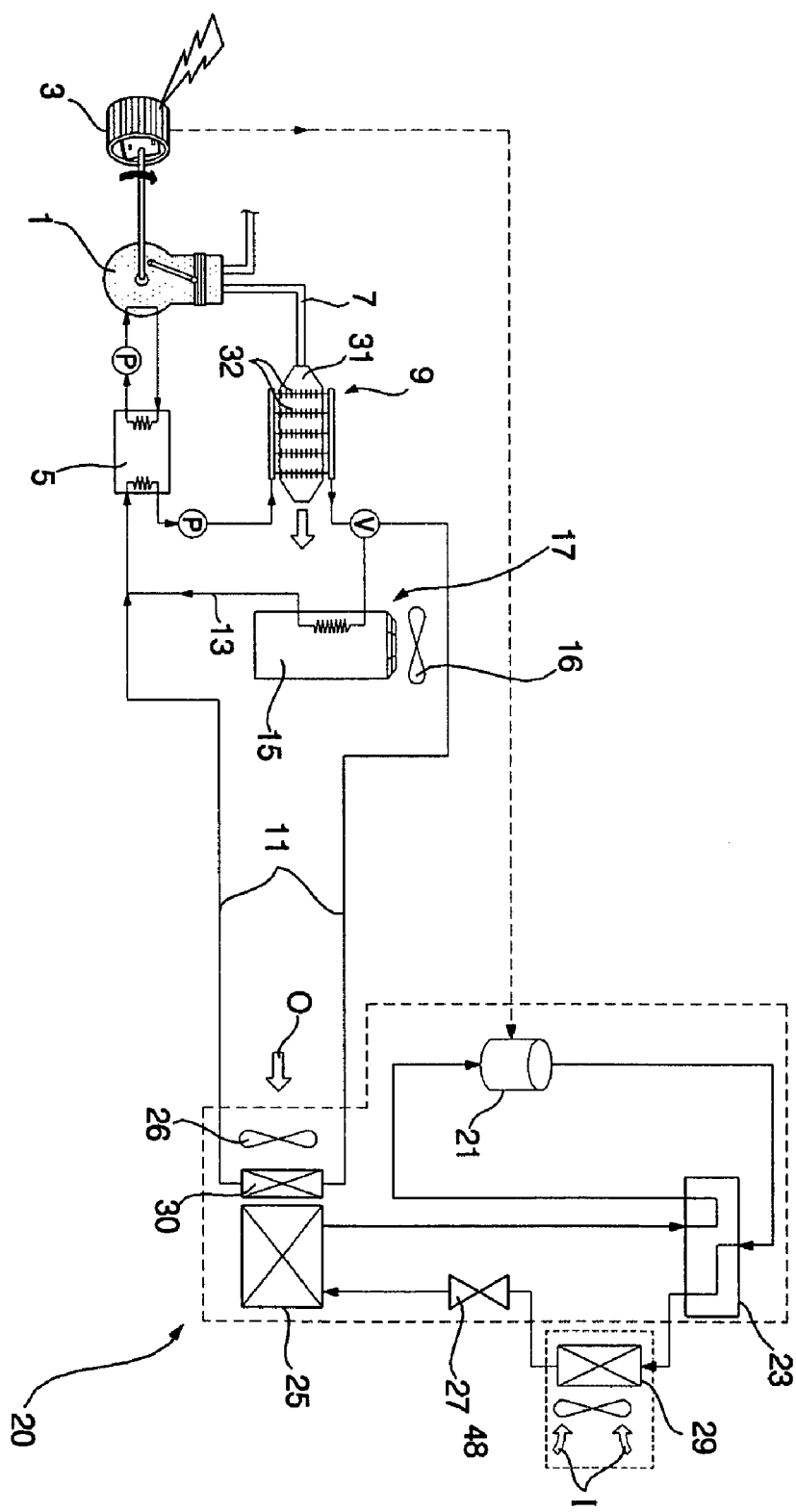
FIG. 1 is a schematic view illustrating a configuration of a conventional cogeneration system which is used for a cooling and heating apparatus.

Hereinafter, exemplary embodiments of a cogeneration system according to the present invention will be described with reference to the annexed drawings. In the following description, identical elements are referred to by the same title and designated by the same reference numeral, without any redundant description thereof.

Figure 2:
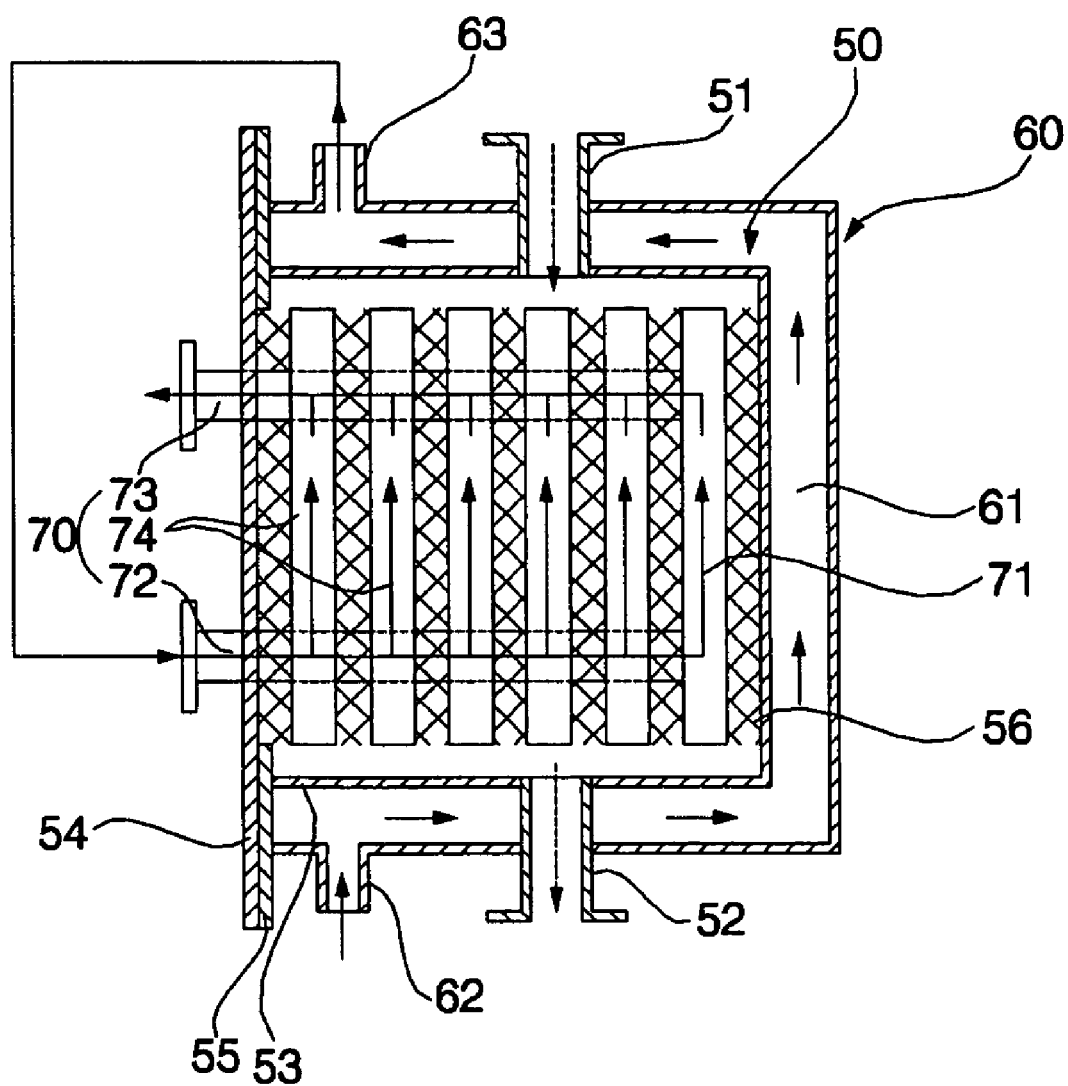
FIG. 2 is a sectional view illustrating an exhaust gas heat exchanger of a cogeneration system according to a first embodiment of the present invention.

FIG. 2 is a sectional view illustrating an exhaust gas heat exchanger of a cogeneration system according to a first embodiment of the present invention.

As shown in FIG. 2, the exhaust gas heat exchanger according to the first embodiment of the present invention includes a heat exchanger body 50 provided with an exhaust gas inlet 51, through which exhaust gas discharged from an engine (not shown) is introduced into the heat exchanger body 50, and an exhaust gas outlet 52, through which the exhaust gas is discharged from the heat exchanger body 50. The exhaust gas heat exchanger also includes a heat exchanger cover 60 for enclosing the heat exchanger body 50 such that a primary heat medium passage 61, through which a heat medium passes, is defined between the outer wall surface of the heat exchanger body 50 and the inner wall surface of the heat exchanger cover 60. The exhaust gas heat exchanger further includes a heat medium tube 70 arranged to extend through the heat exchanger body 50, and adapted to form a secondary heat medium passage 71, through which the heat medium emerging from the primary heat medium passage 61 passes.

The heat exchanger body 50 is arranged in an exhaust gas discharge conduit (not shown), through which the exhaust gas generated from the engine (not shown) is discharged. The exhaust gas inlet 51 and exhaust gas outlet 52 of the heat exchanger body 50 communicate with the exhaust gas discharge conduit (not shown).

Preferably, the exhaust gas inlet 51 is arranged at a top portion of the heat exchanger body 50, whereas the exhaust gas outlet 52 is arranged at a bottom portion of the heat exchanger body 50. The following description will be described only in conjunction with this case.

The heat exchanger cover 60 includes a heat medium inlet 62, through which the heat medium is introduced into the primary heat medium passage 61, and a heat medium outlet 64, through which the heat medium is discharged from the primary heat medium passage 61.

The heat medium inlet 62 is arranged at a bottom portion of the heat exchanger cover 60, whereas the heat medium outlet 63 is arranged at a top portion of the heat exchanger cover 60. It is preferred that the heat medium inlet 62 and heat medium outlet 63 be arranged at positions different from those of the exhaust gas inlet 51 and exhaust gas outlet 52.

The heat exchanger body 50 has a box-shaped structure having plate-shaped thin and flat walls.

That is, the heat exchanger body 50 includes a case 53 opened at one side thereof to provide a passage, through which exhaust gas passes, and a shield member 54 adapted to shield the opened side of the case 53.

The shield member 54 is separably coupled to the case 53. To this end, a coupling member 55 is provided at an opened end of the case 53, for coupling with the shield member 54.

The coupling member 55 extends outwardly from the opened end of the case 53 in the form of a flange. The heat exchanger cover 60 is also coupled to the coupling member 55 of the case 53.

A mesh member 56 is mounted in the heat exchanger body 50, in order to not only diffuse the exhaust gas introduced into the heat exchanger body 50, but also to achieve an enhancement in heat transfer rate.

The mesh member 56 is arranged between the inner wall surface of the heat exchanger body 50 and the heat medium pipe 70.

Preferably, the walls of the heat exchanger body 50 are made of a thermally conductive material so that the exhaust gas passing through the heat exchanger body 50 can heat-exchange with the heat medium passing through the primary heat medium passage 61. On the other hand, the heat exchange cover 60 is preferably made of a thermally insulating material.

Meanwhile, the heat medium tube 70 includes a heat medium inlet tube 72 extending through the heat exchanger body 50, and a heat medium outlet tube 73 extending through the heat exchanger body 50 at a position different from that of the heat medium inlet tube 72. The heat medium tube 70 also includes a plurality of connecting tubes 74 each arranged in the heat exchanger body 50, and connected with the heat medium inlet tube 72 and heat medium outlet tube 73.

Preferably, the heat medium inlet tube 72 and heat medium outlet tube 73 extend into the heat exchanger body 50 through the shield member 54 of the heat exchanger body 50 at positions spaced apart from each other, respectively. It is also preferred that the heat medium inlet tube 72 and heat medium outlet tube 73 extend through upper and lower portions of the shield member 54, respectively.

The connecting tubes 74 are arranged in the heat exchanger body 50 while being uniformly spaced apart from one another along the heat medium inlet tube 72 and heat medium outlet tube 73.

Preferably, each connecting tube 74 has a hollow structure having plate-shaped walls so that the connecting tube 74 has a large heat transfer area.

Hereinafter, operation of the exhaust gas heat exchanger of the cogeneration system having the above-described configuration according to the first embodiment of the present invention will be described.

Exhaust gas discharged from the engine (not shown) during operation of the engine is introduced into the heat exchanger body 50 through the exhaust gas inlet 51.

The exhaust gas introduced into the heat exchanger body 50 is diffused in the heat exchanger body 50 while passing through the mesh member 56.

Meanwhile, the heat medium is introduced through the heat medium inlet 62 into the primary heat medium passage 61 defined between the heat exchanger cover 60 and the heat exchanger body 50. The introduced heat medium primarily heat-exchanges with the exhaust gas in the heat exchanger body 50 while passing through the primary heat medium passage 61.

The heat medium in the primary heat medium passage 61 emerges from the primary heat medium passage 61 through the heat medium outlet 63, and then enters the secondary heat medium passage 71 of the heat medium tube 70 extending in the heat exchanger body 50 through the heat medium inlet tube 72.

The heat medium introduced into the secondary heat medium passage 71 secondarily heat-exchanges with the exhaust gas in the heat exchanger body 50 while passing through the secondary heat medium passage 71, that is, the connecting tubes 74.

The heat medium, which absorbs heat from the exhaust gas through the secondary heat exchange, is fed to a cooling and heating apparatus or a building after emerging from the exhaust gas heat exchanger through the heat medium outlet tube 73, so as to supply the absorbed heat.

Thus, the heat medium primarily absorbs heat from the exhaust gas while passing through the primary heat medium passage 61, enters the interior of the heat exchanger body 50, and then secondarily absorbs heat from the exhaust gas while passing through the secondary heat medium passage 71. Accordingly, an enhancement in heat exchanging efficiency is achieved.

Since the heat exchanger cover 60 arranged around the heat exchanger body 50 insulates the heat of the exhaust gas introduced into the heat exchanger body 50, it is possible to minimize loss of heat.

In addition, since the heat exchanger body 50 has a box-shaped structure having plate-shaped walls, and each connecting tube 74 has a hollow structure having plate-shaped walls, they have large heat transfer areas, respectively, so that an enhancement in heat exchanging efficiency is achieved. The space occupied by the heat exchanger body 50 and connecting tubes 74 is reduced, so that the utility of space can be improved.

Figure 3:
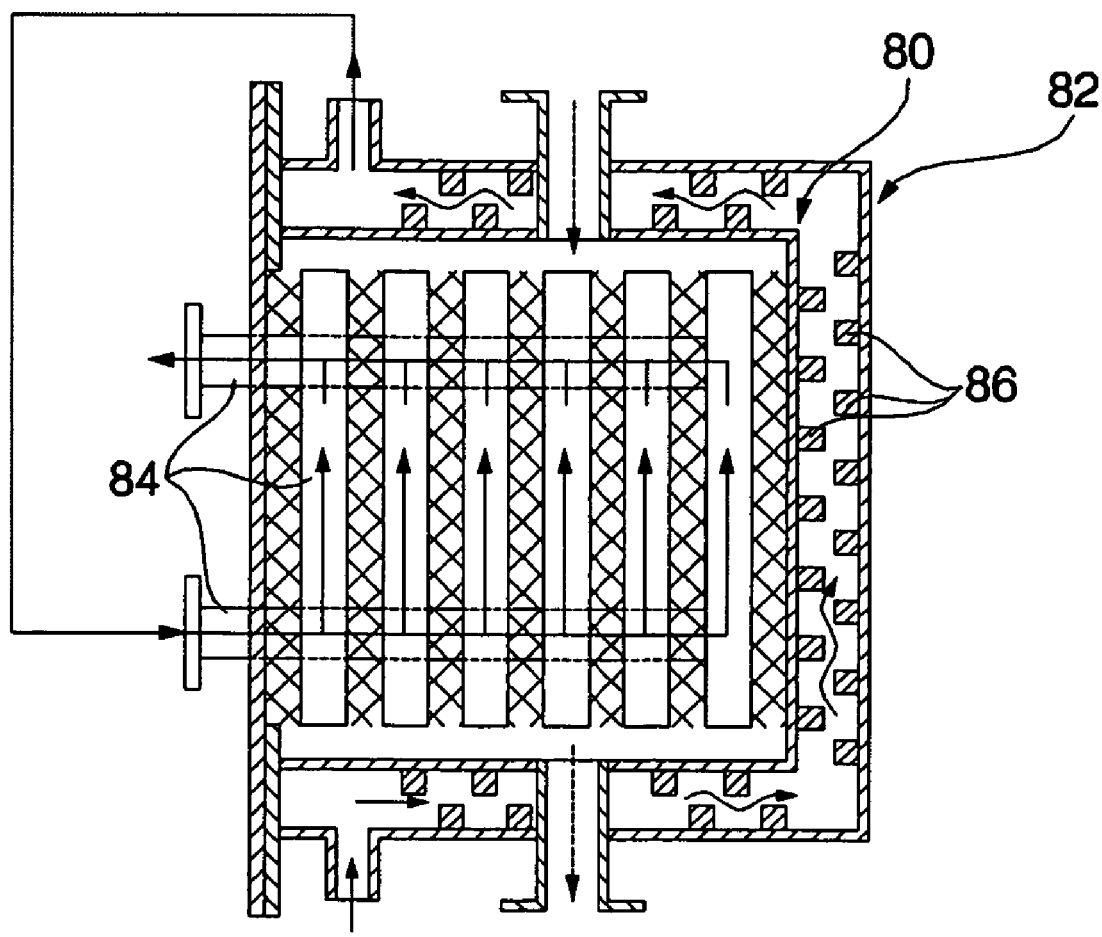
FIG. 3 is a sectional view illustrating an exhaust gas heat exchanger of a cogeneration system according to a second embodiment of the present invention.

FIG. 3 is a sectional view illustrating an exhaust gas heat exchanger of a cogeneration system according to a second embodiment of the present invention.

As shown in FIG. 3, the exhaust gas heat exchanger according to the second embodiment of the present invention includes a heat exchanger body 80, a heat exchanger cover 82 arranged around the heat exchanger body 50 such that a primary heat medium passage is defined between the outer wall surface of the heat exchanger body 80 and the inner wall surface of the heat exchanger cover 82, and a heat medium tube 84 arranged to extend through the heat exchanger body 80, and adapted to form a secondary heat medium passage. The exhaust gas heat exchanger according to the second embodiment has the same configuration as that of the first embodiment, except that a flow guide is arranged in the primary heat medium passage to vary a flow path defined by the primary heat medium passage. Accordingly, no description will be given of the same configuration.

The flow guide includes a plurality of guide protrusions 86 protruded from at least one of the inner wall surface of the heat exchanger cover 82 and the outer wall surface of the heat exchanger body 80. In the illustrated case, the guide protrusions 86 are protruded from both the inner wall surface of the heat exchanger cover 82 and the outer wall surface of the heat exchanger body 80 such that the guide protrusions 86 are uniformly spaced apart from one another by a predetermined distance. In this case, it is preferred that the protrusions 86 on the inner wall surface of the heat exchanger cover 82 and the protrusions 86 on the outer wall surface of the heat exchanger body 80 be alternately arranged.

Accordingly, the heat medium introduced into the primary heat medium passage defined between the heat exchanger cover 82 and the heat exchanger body 80 flows along a serpentine flow path defined by the protrusions 86. Thus, the efficiency of the heat medium heat-exchanging with the exhaust gas in the heat exchanger body 80 is enhanced.

The exhaust gas heat exchanger according to any one of the above-described embodiments of the present invention has various effects.

That is, in the exhaust gas heat exchanger, the heat exchanger cover is arranged around the heat exchanger body such that the primary heat medium passage, through which the heat medium passes, is defined between the heat exchanger cover and the heat exchanger body. In the heat exchanger body, the heat medium tube forming the secondary heat medium passage, through which the heat medium emerging from the primary heat medium passage passes, is arranged. Accordingly, the heat medium primarily absorbs heat from the exhaust gas while passing through the primary heat medium passage, and then secondarily absorbs heat from the exhaust gas while passing through the secondary heat medium passage. As a result, an enhancement in heat exchanging efficiency is achieved.

Since the heat exchanger cover arranged around the heat exchanger body functions to insulate the heat of the exhaust gas introduced into the heat exchanger body, it is possible to minimize loss of heat.

Also, the shield member is separably mounted to the heat exchanger body. Accordingly, there is an advantage in that it is possible to easily remove soot attached to the inner wall surface of the heat exchanger body when the exhaust gas passes through the heat exchanger body.

Since the heat exchanger body has a box-shaped structure having plate-shaped walls, and each connecting tube has a hollow structure having plate-shaped walls, they have large heat transfer areas, respectively, so that an enhancement in heat exchanging efficiency is achieved. The space occupied by the heat exchanger body and connecting tubes is reduced, so that the utility of space can be improved. It is also possible to realize a compact structure of the exhaust gas heat exchanger.

In addition, since the flow guide is arranged in the primary heat medium passage, it is possible to enhance the heat exchanging efficiency of the heat medium passing through the primary heat medium passage.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An exhaust gas heat exchanger for a cogeneration system comprising:
    a heat exchanger body provided with an exhaust gas inlet, through which exhaust gas discharged from an engine is introduced into the heat exchanger body, and an exhaust gas outlet, through which the exhaust gas is discharged from the heat exchanger body;
    a heat exchanger cover provided with a heat medium inlet through which a heat medium is introduced into the heat exchanger cover, and a heat medium outlet through which the heat medium inside the heat exchanger cover is discharged, and arranged to enclose the heat exchanger body such that a primary heat medium passage, through which a heat medium passes, is defined between an outer wall surface of the heat exchanger body and an inner wall surface of the heat exchanger cover; and
    a heat medium tube arranged to extend through the heat exchanger body, and adapted to form a secondary heat medium passage, through which the heat medium emerging from the primary heat medium passage passes, wherein the heat medium tube comprises:
    a heat medium inlet tube extending through the heat exchanger body and being connected with the heat medium outlet formed at the heat exchanger cover;
    a heat medium outlet tube extending through the heat exchanger body at a position different from a position of the heat medium inlet tube; and
    a plurality of connecting tubes each arranged in the heat exchanger body, and connected with the heat medium inlet tube and the heat medium outlet tube.

2. The exhaust gas heat exchanger according to claim 1, wherein the heat exchanger body has a box-shaped structure having plate-shaped walls.

3. The exhaust gas heat exchanger according to claim 1, wherein the connecting tubes are spaced apart from one another by a predetermined distance.

4. The exhaust gas heat exchanger according to claim 3, wherein each of the connecting tubes has a hollow structure having plate-shaped walls.

5. The exhaust gas heat exchanger according to claim 4, further comprising:
    a flow guide arranged in the primary heat medium passage to vary a flow path defined by the primary heat medium passage.

6. The exhaust gas heat exchanger according to claim 5, wherein the flow guide comprises a plurality of guide protrusions protruded from at least one of the inner wall surface of the heat exchanger cover and the outer wall surface of the heat exchanger body.

7. The exhaust gas heat exchanger according to claim 1, wherein the heat exchanger body includes a body case opened at one side thereof and the heat exchanger cover includes a cover case opened at the one side thereof, includes a body case opened at one side thereof and the heat exchanger cover includes a cover case opened at one side thereof,
    wherein a shield plate is coupled to the body case and the cover case such that the opened side of the body case and the cover case is covered by the shielding plate,
    wherein the primary heat medium passage is formed between the heat exchanger body and the heat exchange cover except one side of the heat exchanger body and the heat exchanger cover to which the shielding plate is coupled.

* * * * *